Patented Aug. 16, 1932

1,871,673

UNITED STATES PATENT OFFICE

GEORGE HOLLAND ELLIS AND HENRY CHARLES OLPIN, OF SPONDON, NEAR DERBY, ENGLAND, ASSIGNOR TO CELANESE CORPORATION OF AMERICA, A CORPORATION OF DELAWARE

COLORING OF CELLULOSE DERIVATIVES

No Drawing. Application filed September 22, 1928, Serial No. 307,771, and in Great Britain November 28, 1927.

This invention relates to dyeing, printing, stencilling or otherwise coloring yarns, threads, fabrics or other products made with or containing cellulose acetate or other organic acid esters of cellulose, for instance cellulose formate, propionate or butyrate or the products obtained by the treatment of alkalized cellulose with esterifying agents (e. g. the product known as "immunized cotton" made with p-toluene sulphochloride), or made with or containing cellulose ethers, for example methyl, ethyl or benzyl cellulose, or the corresponding condensation products of cellulose and glycols or other polyhydric alcohols. All such cellulose derivatives are hereinafter referred to as organic substitution derivatives of cellulose.

According to the present invention materials made with or containing cellulose acetate or other organic substitution derivatives of cellulose are dyed or otherwise colored with unsulphonated thiazole derivatives, i. e. coloring matters or compounds containing the group

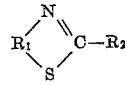

where $R_1$ and $R_2$ represent substituted or unsubstituted aryl nuclei. We have found that very desirable and useful tints may thereby be obtained.

The dyestuffs may be applied in substance or produced on the fibre. Those containing diazotizable amino groups may be diazotized on the fibre and developed with suitable developers while those containing groups capable of effecting a coupling may be similarly developed by means of diazo-bodies.

The dyestuffs or components may be applied to the fibre in any suitable form. They are usually insufficiently soluble in water and, to apply them from an aqueous medium, they may be suspended or dispersed by any convenient methods. For example they may be dispersed by milling (e. g. in the so-called colloid mills) or by dissolving in a solvent and mixing the solution with water containing or not containing a protective colloid or they may be dispersed with the aid of dispersators for instance by the methods described in British Patent No. 219,349 corresponding to U. S. Patent No. 1,618,413, British Patent No. 224,925 corresponding to U. S. Patent No. 1,618,414, British Patent No 242,393 corresponding to U. S. Patent No. 1,694,413, British Patent No. 242,711 corresponding to U. S. Patent No. 1,690,481 and in British Patents Nos. 269,960, 273,819 and 273,820.

The following examples of dyestuffs applied in substance and of dyestuffs produced on the fibre are intended to illustrate but not to limit the invention:—

A. Dyestuffs applied in substance from aqueous dispersions.

(1) Compound obtained by diazotizing dehydrothio-p-toluidine and coupling with phenol having the probable formula:

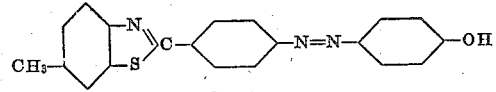

gives a yellow shade.

(2) Compound obtained by diazotizing dehydrothio-p-toluidine and coupling with m-toluylenediamine having the probable formula:

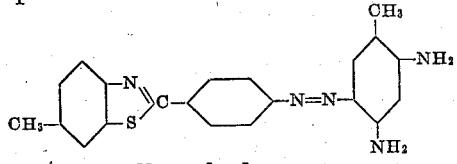

gives a yellow shade.

(3) Compound obtained by diazotizing dehydrothio-p-toluidine and coupling with m-toluidine having the probable formula:

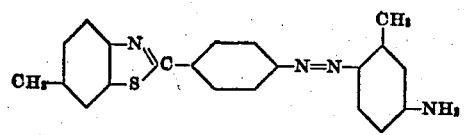

gives a yellow shade.

(4) Compound obtained by condensing dehydrothio-p-toluidine with 2.4-dinitrochlorbenzene having the probable formula:

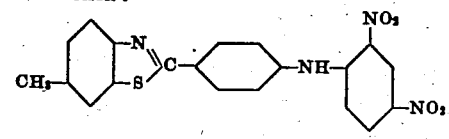

gives a yellow shade.

(5) Compound obtained by condensing dehydrothio-p-toluidine with 2.5-dichlornitrobenzene having the probable formula:

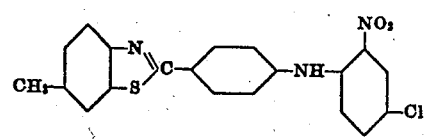

gives a yellow shade.

B. Dyestuffs formed on the fibre.
Cellulose acetate is first dyed with dehydrothio-p-toluidine from an aqueous dispersion, the dyeing diazotized and developed with the following developers:—

| Developer | Probable formula of dye | Shade |
|---|---|---|
| Phenol | | Yellow |
| p-Chlor-phenol | | Yellow |
| Dimethyl-aniline | | Orange |
| β-naphthylamine | | Reddish orange |
| β-naphthol | | Orange red |
| 2.3-amino-naphthoic acid | | Red |
| 1-naphthyl-amine-2-ethyl-ether | | Red |
| ethyl-α-naphthyl-amine | | Red |

| Developer | Probable formula of dye | Shade |
|---|---|---|
| ethyl-β-naphthyl-amine | 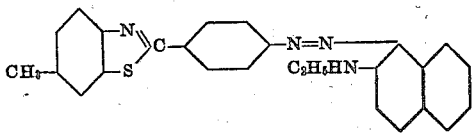 | Red |
| 2.3-hydroxy-naphthoic acid | 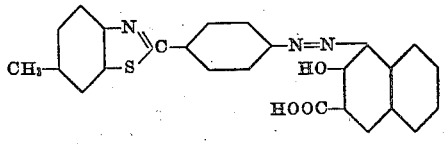 | Bluish red |

Though in the above examples dehydrothio-p-toluidine has alone been employed as the thiazole derivative, it is to be regarded as merely typical of the compounds which may be employed according to the invention.

The invention further comprises the dyeing or otherwise coloring of mixed goods containing, for example, in addition to the cellulose ester or ether, wool, silk, cotton or artificial silks or fibres of the cellulosic type, other dyestuffs being applied, if desired, to the non-ester or non-ether portion either before, after, or, if compatible, together with the dyestuffs of the present invention.

The following examples illustrate the production of colorations according to the present invention, but are not to be considered as limiting its scope in any way:—

Example I

To dye a yellow shade on 10 kilos of cellulose acetate knit fabric:—

100 grms. of finely ground dyestuff obtained by condensing dehydrothio-p-toluidine with 2:4-dinitrochlorbenzene (for example in methylated spirit solution, using sodium acetate as acid absorber) are well stirred or ground with one litre of sodium sulphoric-inoleate (50%); the mixture is heated at 95–100° C. until a good dispersion is obtained, and then diluted with boiling soft water, and further boiled. The liquor is then filtered into a dyebath containing 200 litres of cold soft water, the goods entered, and the temperature raised during ¾ hr. to 75–80° C. and maintained at this temperature until the desired shade is achieved. The fabric is then lifted, rinsed and dried or otherwise as requisite.

Example II

To dye a yellow shade on 10 kilos of cellulose acetate knit fabric:—

1 kilo of a 10% aqueous paste of the dyestuff obtained by coupling dehydrothio-p-toluidine with m-toluylenediamine is ground to a suitable degree of fineness in a so-called colloid mill, and to the milled paste is added a dispersion of 200 ccs. cyclohexanol in 1 kilo of sodium sulphoricinoleate (50%). The whole is then diluted, with stirring, with boiling soft water, and filtered into a dyebath containing 300 litres of cold soft water. Dyeing is carried out exactly as in the previous example, the fabric being then lifted, rinsed and dried or otherwise treated as requisite.

Example III

To dye 10 kilos of wool-cellulose acetate mixed goods in hank form:— cellulose acetate_____ yellow.
wool_____ red.

ratio wool : cellulose acetate 2 : 1

30 grams of the dyestuff obtained by diazotizing dehydrothio-p-toluidine and coupling with phenol are dispersed in 300 ccs. of sodium sulphoricinoleate by the method described in Example I, diluted with boiling water, and passed through a filter cloth into a dyebath containing 250 litres of soft water. The wool-cellulose acetate hanks are entered, and dyeing commenced cold, the bath being heated to 75–80° C. and dyeing continued till the requisite shade on the cellulose acetate is achieved. The goods are now lifted, rinsed and the wool dyed in a fresh bath of 250 litres volume containing 150 grams of Azo Rhodine 2G. (Colour Index No. 31.) Dyeing is carried out at 80° C. with addition of 1 kilo of Glauber's salt, exhaustion being assisted by addition of 2–3% acetic or formic acid.

In a similar manner colourations may be obtained with unsulphonated thiazole derivatives on materials containing other organic substitution derivatives of cellulose, for example cellulose formate, cellulose butyrate, "immunized cotton," or ethyl cellulose.

What we claim and desire to secure by Letters Patent is:

1. Process for coloring materials comprising organic substitution products of cellulose, comprising applying thereto unsulphonated thiazole derivatives in which the dehydrothio-p-toluidine residue

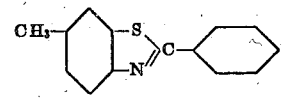

is linked through nitrogen to an aryl group.

2. Process for coloring materials comprising cellulose esters comprising applying thereto unsulphonated thiazole derivatives in which the dehydro-thio-p-toluidine residue

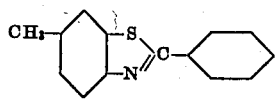

is linked through nitrogen to an aryl group.

3. Process for coloring materials comprising cellulose acetate, comprising applying thereto unsulphonated thiazole derivatives in which the dehydro-thio-p-toluidine residue

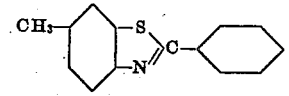

is linked through nitrogen to an aryl group.

4. Materials comprising organic substitution products of cellulose, dyed with unsulphonated thiazole derivatives in which the dehydro-thio-toluidine residue

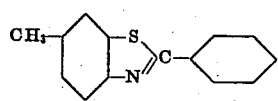

is linked through nitrogen to an aryl group.

5. Materials comprising cellulose esters dyed with unsulphonated thiazole derivatives in which the dehydro-thio-p-toluidine residue

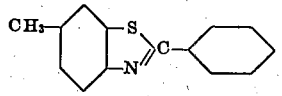

is linked through nitrogen to an aryl group.

6. Materials comprising cellulose acetate dyed with unsulphonated thiazole derivatives in which the dehydro-thio-p-toluidine residue

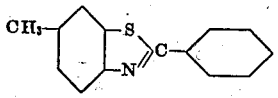

is linked through nitrogen to an aryl group.

7. Process for coloring materials comprising cellulose acetate, comprising applying thereto unsulphonated thiazole derivatives in which the dehydro-thio-p-toluidine residue

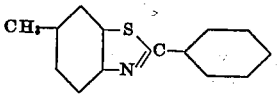

is linked through nitrogen to a nitroaryl group.

8. Materials comprising cellulose acetate dyed with unsulphonated thiazole derivatives in which the dehydro-thio-p-toluidine residue

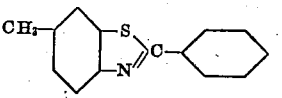

is linked through nitrogen to a nitroaryl group.

In testimony whereof, we have hereunto subscribed our names.

GEORGE HOLLAND ELLIS.
HENRY CHARLES OLPIN.

CERTIFICATE OF CORRECTION.

Patent No. 1,871,673.  August 16, 1932.

GEORGE HOLLAND ELLIS ET AL.

It is hereby certified that error appears in the printed specification of the above numbered patent requiring correction as follows: Page 3, line 47, for the number "200" read 300; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)